United States Patent
Brubacher et al.

(10) Patent No.: US 6,638,558 B2
(45) Date of Patent: Oct. 28, 2003

(54) MASA FLAVORED CEREAL GERM AND A PROCESS FOR MAKING SAME

(75) Inventors: Edward Brubacher, Indianapolis, IN (US); James Pause, Avon, IN (US); Steve Sheehan, Fishers, IN (US); Ansui Xu, Carmel, IN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 09/965,642

(22) Filed: Sep. 27, 2001

(65) Prior Publication Data

US 2003/0059516 A1 Mar. 27, 2003

(51) Int. Cl.[7] ............................. A23L 1/172
(52) U.S. Cl. ............... 426/622; 426/506; 426/507; 426/508; 426/510; 426/626
(58) Field of Search ............... 426/622, 626, 426/506, 507, 508, 510

(56) References Cited

U.S. PATENT DOCUMENTS

| 2,704,257 | A | | 3/1955 | Diez De Sollano et al. |
|---|---|---|---|---|
| 3,194,664 | A | | 7/1965 | Eytinge |
| 3,368,902 | A | | 2/1968 | Berg |
| 3,404,986 | A | | 10/1968 | Wimmer et al. |
| 3,653,915 | A | | 4/1972 | Rubio |
| 3,655,385 | A | | 4/1972 | Rubio |
| 3,859,452 | A | | 1/1975 | Mendoza |
| 4,329,371 | A | | 5/1982 | Hart |
| 4,555,409 | A | | 11/1985 | Hart |
| 4,594,260 | A | | 6/1986 | Vaqueiro et al. |
| 4,985,269 | A | | 1/1991 | Irvin et al. |
| 5,176,931 | A | | 1/1993 | Herbster |
| 5,532,013 | A | | 7/1996 | Martinez-Bustos et al. |
| 5,558,886 | A | | 9/1996 | Martinez-Bustos et al. |
| 5,558,898 | A | | 9/1996 | Sunderland |
| 6,001,409 | A | * | 12/1999 | Gimmler et al. ............ 426/549 |
| 6,265,013 | B1 | * | 7/2001 | Martinez-Montes et al. ..... 426/622 |

* cited by examiner

Primary Examiner—Helen Pratt
(74) Attorney, Agent, or Firm—Fitch, Even, Tabin & Flannery

(57) ABSTRACT

The present invention provides a germ-based additive for enhancing masa flavor in food products produced from flour for dough which includes the additive. The additive includes alkaline cooked cereal germ. The additive may be milled and may be added to food products in an amount effective for producing a masa flavor without the use of masa flour.

47 Claims, 2 Drawing Sheets

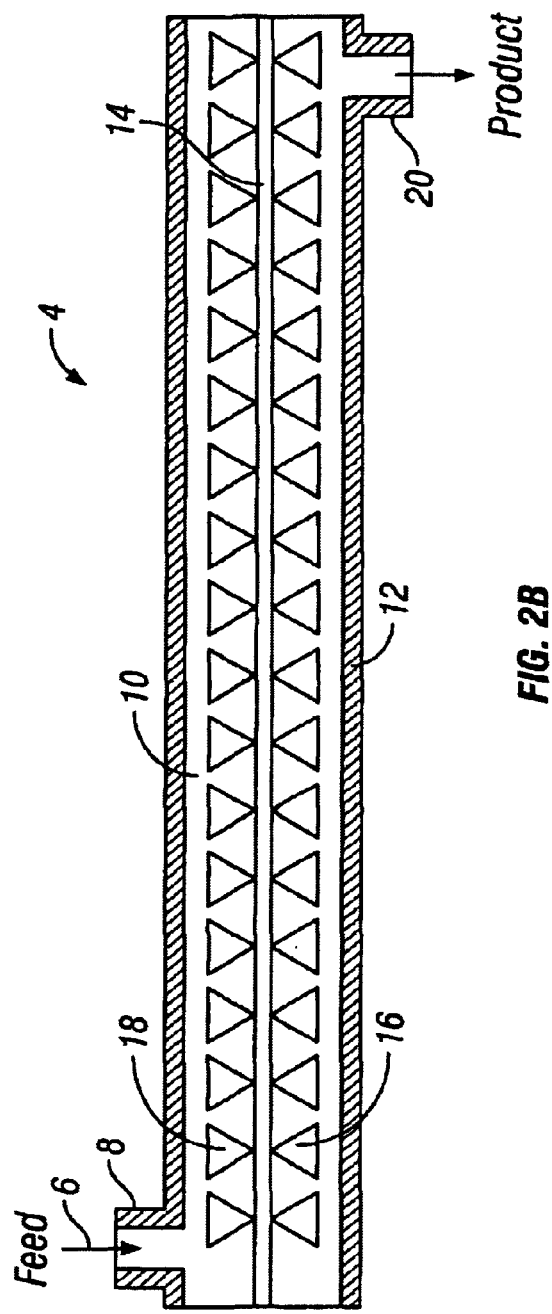
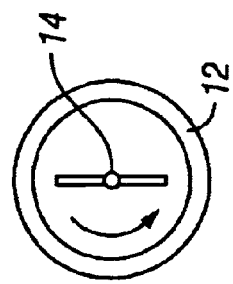
FIG. 2A
FIG. 2B

MASA FLAVORED CEREAL GERM AND A PROCESS FOR MAKING SAME

FIELD OF THE INVENTION

This invention relates to a cooked cereal germ having an enhanced masa flavor and a process for making the cooked masa flavored cereal germ. More particularly, this invention relates to cooked corn germ which has been cooked with water and an alkaline agent to provide an alkaline cooked cereal germ with an enhanced or robust masa flavor.

BACKGROUND OF THE INVENTION

For the preparation of refined foods, cereal grain is usually subjected to milling processes. In these processes, the germ, which is rich in minerals and vitamins, is separated from the bran and endosperm of the cereal. Refined mill products, such as flaking grits and masa flour, consist chiefly of the endosperm. Portions of the corn kernel removed from the endosperm, such as the germ, are considered to be low value by-products which are often put into animal feed. The invention described herein enhances the value of cereal germ by making the germ useful in making masa flavored food products for human consumption.

Further, masa flavored food products are gaining in popularity. Most or practically all of these products are masa flour (corn flour) based. As a result it would be advantageous to impart a masa flavor to traditionally non-masa food products such as wheat flour bread, wheat flour tortillas, wheat flour pizza crust, wheat flour muffins, wheat based breakfast cereals, cakes, cookies, crackers, corn dogs, pretzels and fillings for tacos, tamales and tortillas. Using masa flour directly in non-masa based products such as wheat flour products, however, will change the structure of the food because relatively large amounts of masa flour would be needed to impart a masa flavor. With a masa flavor enhancer, however, a masa flavor can be imparted to a food product without changing the structure of the food because small amounts of a flavor enhancer can be used to impart a masa flavor. This can reduce development costs of producing non-masa flour products which have a masa taste.

COMPONENTS OF THE MAIZE (CORN) KERNEL

Botanically, a maize kernel is known as a caryopsis, a dry, one-seeded, nutlike berry in which the fruit coat and the seed are fused to form a single grain. Mature kernels are composed of four major parts: pericarp (hull or bran), germ (embryo), endosperm and tip cap.

An average composition of whole maize, and its fractions, on a moisture-free (dry) basis is as follows:

TABLE 1

| Fraction of Whole Maize | Kernel % | Starch % | Protein % | Liquid % | Sugar % | Ash % |
|---|---|---|---|---|---|---|
| Whole grain | 100 | 71.5 | 10.3 | 4.8 | 2.0 | 1.4 |
| Endosperm | 82.3 | 86.4 | 9.4 | 0.8 | 0.6 | 0.3 |
| Germ | 11.5 | 8.2 | 18.8 | 34.5 | 10.8 | 10.1 |
| Pericarp | 5.3 | 7.3 | 3.7 | 1.0 | 0.3 | 0.8 |
| Tip cap | 0.8 | 5.3 | 9.1 | 3.8 | 1.6 | 1.6 |

Germ: The scutellum and the embryonic axis are the two major parts of the germ. The scutellum makes up 90% of the germ, and stores nutrients mobilized during germination. During this transformation, the embryonic axis grows into a seedling. The germ is characterized by its high fatty oil content. It is also rich in crude proteins, sugars, and ash constituents. The scutellum contains oil-rich parenchyma cells which have pitted cell walls. Of the sugars present in the germ, about 67% is glucose.

Endosperm: The endosperm contains the starch, and is lower in protein content than the germ and the bran. It is also low in crude fat and ash constituents.

Pericarp: The maize kernel is covered by a water-impermeable cuticle. The pericarp (hull or bran) is the mature ovary wall which is beneath the cuticle, and comprises all the outer cell layers down to the seed coat. It is high in non-starch-polysaccharides, such as cellulose and pentosans. A pentosan is a complex carbohydrate present in many plant tissues, particularly brans, characterized by hydrolysis to give five-carbon-atom monosaccharides (pentoses). It is any member of a group of pentose polysaccharides having the formula $(C_5H_8O_4)_n$ found in various foods and plant juices. Because of its high fiber content, the pericarp is tough.

Tip cap: The tip cap, where the kernel is joined to the cob, is a continuation of the pericarp, and is usually present during shelling. It contains a loose and spongy parenchyma.

CORN MILLING

In milling corn to obtain grits and flour, the corn is first cleaned, and is then usually passed through a scourer to remove the tip from the germ end of the kernel. The corn is then tempered by the addition of water to a moisture content which is generally from about 21% to about 24%. The corn is frequently then passed through a corn degerminator, which frees the bran and germ, and breaks the endosperm into two or more pieces. The stock from the degerminator is generally dried to about 14% to 16% moisture in revolving dryers equipped with steam coils, and is then cooled in revolving or gravity-type coolers. The stock is next passed through a hominy separator, which first separates the fine particles, and then grades and polishes the larger fragments into four sizes. The various grades of broken corn are passed through centrifugal-type aspirators to remove any loose bran from the endosperm fragments, and produce milled cereal by-products such as aspirated bran.

MASA FLOUR AND DOUGH

Nixtamalization is the cooking of cereal grain, such as whole corn kernels, in a medium which usually contains an alkaline agent, such as water containing lime $Ca(OH)_2$. Thereafter there is steeping (soaking) of the cereal grain for a period of time, for example, for about three to about fourteen hours, subsequent draining of any remaining cooking liquor, washing of the cereal grains, and grinding of the cereal grains to make with drying a cereal grain flour, which may be added with water to make a cereal grain dough from which tortillas and related products may be prepared.

SUMMARY OF THE INVENTION

The present invention provides a germ-based additive for enhancing masa flavor in food products produced from flour or dough which includes the additive. The invention also includes food products which include the additive in an amount effective for producing a masa flavor without the use of masa flour. In one aspect the food products include the additive to provide the masa taste and are substantially without masa flour. Hence, the additive of the invention makes it possible to add masa flavor to foods that are, for example wheat based, and allow the foods to retain their original organoleptic properties such as texture, mouthfeel and appearance. These properties would be lost if large amounts of masa flour is used to impart masa flavor. If a bread was made with a 50—50 blend of masa/wheat flour, the bread would not have the desired and typical aerated, spongy texture of wheat bread, but rather a coarse and heavy texture. If the additive of the invention is used, however, at a level of 10 weight percent, the resulting bread would be aerated, spongy and yet also have a much stronger masa flavor than the bread made with 50—50 masa flour and wheat flour.

The masa flavor enhancing additive is prepared through cooking cereal germ with water and an alkaline agent, such as lime, for a time and temperature which is effective for providing an alkaline cooked cereal germ with a masa flavor. An aspect of the invention includes drying the alkaline cooked cereal and milling the alkaline cooked cereal before or after drying to provide the alkaline cooked cereal germ with a particle size which is suitable for a desired food application.

In one aspect, the cereal germ used in preparing the masa flavor enhancing additive has a cereal grain germ content of at least about 25%, particularly at least about 50%, and more particularly at least about 90%, and up to about 100% thereof, by weight percentage. The cereal germ also contains not more than about 40 weight percent endosperm and not more than about 75 weight percent bran. In another aspect, the cereal starting material used in the preparation of the masa flavor enhancing additive has a relatively high protein content material, such as at least about 15% by weight protein content. The germ can be wheat germ, oat germ, barley germ, rice germ, rye germ, sorghum germ and mixtures thereof, but in one aspect of the invention the germ is corn germ.

In another aspect, the germ used in the invention, such as corn germ is tempered with the alkaline agent such as CaO, $Ca(OH)_2$ and $CaCO_3$ and then is cooked, such as with steam, for a time and temperature which is effective to provide an alkaline cooked cereal germ which has a masa flavor. Cooking is effective to deactivate lipases and lipoxygenases in amounts to effect the shelf life of the cooked germ and prevent rapid rancidity as well as impact a masa flavor by virtue of a reaction of the alkaline agent with the germ.

Drying of the alkaline cooked cereal germ grain includes heating the alkaline cooked cereal germ in a dryer, such as rotary dryer which may include heat exchange tubes. The moist cooked cereal germ contacts the heat exchange tubes, typically intermittently, during the drying procedure. The heat exchange tubes used for this purpose are heated by conducting steam or hot water through the tubes so that the outer surfaces of the tubes dry the alkaline cooked cereal germ as it contacts the tubes. This drying arrangement is superior to other alternatives, such as direct heat toasting, because it provides uniform heating without the need for strict monitoring and control to avoid scorching of the material being heated.

As can be appreciated, it surprisingly has been found that germ fractions derived from grain milling and the like, which previously were considered to be low value products, can be effectively used for making masa flavor enhancing agents and additives for food products suitable for human consumption, especially food products which are substantially without masa flour.

In one aspect, the masa flavor enhancing additive is mixed with masa flour and water in an amount effective to increase the masa flavor in a cooked food product made from the resulting dough including the additive as compared to a cooked food product made with the dough which includes germ, but is absent the additive of the invention. In another aspect the additive of the invention is mixed with a non-masa flour in amount effective to impart a masa flavor to the food product which is substantially without masa flour or without an amount of masa flour which would effect a masa taste. In either of these aspects, to impart a masa flavor enhancing effect to the cooked food products, the masa flavor enhancing additive generally is added to flour (which may or may not include masa flour) at a level of at least about 0.5 weight percent, and often in an amount ranging from about 0.5 to about 10.0 weight percent, based on their combined weight.

An effective amount of the masa flavor enhancing additive in this respect, for a given amount of flour and dough, can be easily determined in an empirical manner by straightforward taste/flavor/aroma testing by comparison to food products otherwise prepared the same way except without the additive. The masa flavor enhancing additive can be added in wet or dry form to either the flour or dough, or both.

The food products made by the method described above and which have an enhanced masa flavor using the masa flavor enhancing additive described herein may include cooked food products made with masa flour-containing doughs. These food products include tortillas, tortilla chips, corn chips, nachos, taco shells and the like. These food products generally may be prepared from the modified dough of the invention by generally known methods used for those purposes. The masa flavor enhancing agent does not adversely impact or impair the dough making and food preparation procedures. In addition, the additive imparts or increases (i.e., enhances) the authentic masa flavor in these products while permitting the food products to retain other flavors and other positive attributes of the food products. Additionally, food products that can include the masa flavor enhancing additive without masa flour and do not rely on masa flour for masa taste, include wheat flour based foods such as wheat flour bread, wheat flour tortillas, wheat flour pizza crust, wheat flour muffins, wheat based breakfast cereals, cakes, cookies, crackers, pretzels and other products such as fillings for tacos, tamales and tortillas.

Other advantages, benefits, utilities, and aspects of the invention will become apparent from the following descriptions of the invention.

DESCRIPTION OF THE DRAWINGS

FIG. 2 shows equipment which may be used in making the additive of the invention.

DETAILED DESCRIPTION OF THE INVENTION

Definitions

Figure 1:
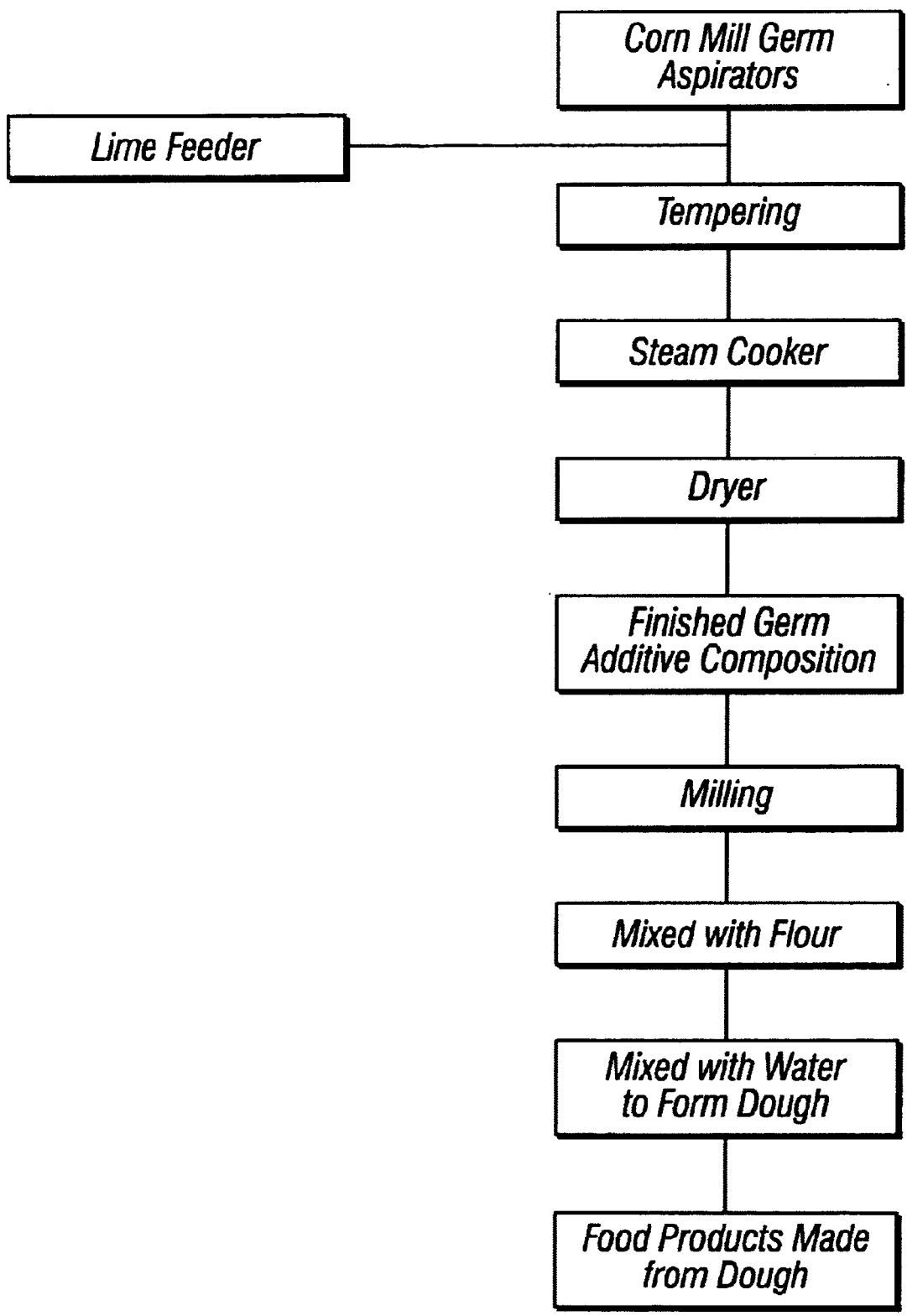
FIG. 1 is a block diagram which shows the process for making the germ additive of the invention.

"Substantially without masa flour" means insufficient masa flour to impart a detectable masa taste by trained taste panelists. Nor should the amount of masa flour substantially affect the organoleptic qualities of the food product. Generally this means that a product would have less than about 1 weight percent masa flour.

The additive may be prepared as illustrated in FIG. 1. As is shown in the figure, germ (which may have been flattened on a roll mill, alkaline agent, such as lime $Ca(OH)_2$, and water are mixed and are cooked to provide the masa flavor enhancer. The water and alkaline agent are in amounts effective to effect a masa flavor to the germ at cooking times and temperatures which will effect such flavor. These cooking times range from about 15 seconds to about 20 minutes at temperatures of about 150 to about 300° F. The aqueous germ/alkaline agent mixture contains from about 0.01 to about 50 weight percent alkaline agent based upon the weight of the mixture, and preferably about 0.5 to about 15 weight percent alkaline agent. The amount of alkaline agent in the aqueous alkaline germ mixture is effective for providing the mixture with a pH of from about 9 to about 13.5 and preferably to about 12. The water in the aqueous mixture is an amount effective for providing the cooked, masa flavored germ. Generally the water comprises at least about 25 weight percent of the mixture. The amount of water used to achieve the latter moisture content is minimized so that an alkaline waste water stream is minimized or eliminated. Moisture may be provided to the cooked product by supplying steam for cooking the product. Steam also minimizes water used in the process and avoids a waste water stream. The moisture content of the cooked mixture will preferably be about 30 weight percent.

The alkaline agent employed in the process may be calcium oxide, calcium hydroxide and calcium carbonate.

The alkaline agent can be added in the water employed to cook the germ, can be mixed with the germ and starch prior to water addition, or can be mixed with the germ after water addition. The method for adding the alkaline agent to the germ is not critical. However, liquid water is employed to cook the germ.

In a preferred cooking process, about 10 weight percent of hydrated lime $Ca(OH)_2$ is added to germ through a hydrated lime feeder and is mixed with the germ. Thereafter, water is mixed with the germ and lime in a ratio of about 30 part of water or more to about 70 part of germ and lime mixture. This should result in a moisture content of the mixture of at least about 25 weight percent, and preferably from about 28 to about 32 weight percent, which is optimal.

After mixing, the water/germ/lime blend is tempered to infuse or transport the alkaline agent into the germ to effect the masa taste to the germ. The taste is obtained, however, after the tempering and after cooking. Generally the blend is tempered at from about 33° F. to about 150° F. for about 1 to about 120 minutes, although tempering time is not critical.

After tempering, the tempered blend is cooked to effect the reaction of the alkaline agent with the germ to effect the masa flavor to the germ. The cooking temperature generally will be in the range of about 150° F. to about 300° F. for about 15 seconds to about 20 minutes.

The cooking of the germ, water and alkaline agent can be done in a continuous, or in a batch, process. The heating can be achieved in a number of ways, such as by directly injecting live steam or heated water into the mixture or by adding steam or heated water to maintain the above-described temperature for the mixture.

After cooking, the cooked alkaline-treated germ may be milled wet or may be dried without milling and then milled. Drying of the alkaline cooked cereal germ grain includes heating the alkaline cooked cereal germ in a dryer, such as rotary dryer which may include heat exchange tubes. The moist cooked cereal germ contacts the heat exchange tubes, typically intermittently, during the drying procedure. The heat exchange tubes used for this purpose are heated by conducting steam or hot water through the tubes so that the outer surfaces of the tubes dry the alkaline cooked cereal germ as it contacts the tubes. This drying arrangement is superior to other alternatives, such as direct heat toasting, because it provides uniform heating without the need for strict monitoring and control to avoid scorching of the material being heated. Drying is done at about 150° F. to about 210° F. to provide a dried cooked alkaline treated germ having a moisture content of not more than about 14 weight percent. The total residence time of the cooked germ within the dryer is generally from about 10 to about 30 minutes. A flash dryer may be used with an inlet temperature of about 250° F. to about 500° F. and an outlet temperature of about 150° F. to about 280° F. to dry the alkaline-cooked cereal germ to a moisture of below about 14%.

After drying, the cooked dehydrated additive composition is milled in, for example, a stone mill, disc mill, hammer mill, cylinder mill, or other mill, or otherwise size reduced, such that the average particle diameter of the milled cooked dehydrated additive composition is generally less than about 1.18 square mm. (i.e., the particles will pass through a screen having 1.18 square mm openings) and preferably about 99% of it. However, the average particle size of the milled dehydrated additive composition need only be small enough such that it may be added to flour or dough, and tortillas or related products may be made therefrom. Preferably, a hammer mill is employed.

The resulting cooked, dehydrated and milled additive composition then may be sifted to remove material coarser than that which will pass through about a U.S. No. 16 mesh sieve. The moisture content of the sifted product will generally be less than about 15 weight percent and will preferably be less than about 13 weight percent. However, the moisture content of the sifted product is not critical. It is possible to add wet additives of the invention to wet masa or other dough to produce the tortillas and related products.

Cooking

The preferred mode of cooking is by the injection of steam. But preferably the cooker cooks with indirect and direct heat, such as a mixer-type cooker. This cooker, as shown in FIG. 2, is an elongated heating device which has a heat jacket surrounding a channel through which the tempered product is conveyed. The hydrated and tempered product is moved forward down the cooker by means of paddles on a hollow rotor in the device. The rotor is connected to a steam source to transmit steam to the paddles which are hollow and are open to receive steam from the rotor. Steam enters the rotor and is conveyed there through into the paddles which have one or more holes from which the steam is injected into the tempered product. The paddles uniformly distribute the steam in the product being cooked. Indirect heat is applied from the jacket of the device. The direct heat brings the tempered product to temperature while the indirect heat keeps the cooker and tempered alkaline germ at an elevated temperature. Cooking conditions are controlled through selection of a specific length for the device, the number of open steam holes in the paddles, the amount of indirect heat being applied and the rate the tempered product is conveyed through the cooker.

Referring to FIG. 2 for more detail, the tempered product is fed into an elongated heating device 4 shown in FIG. 2. The tempered product is fed into the heating device feed aperture 8 into channel 10. The tempered product is conveyed down channel 10 in the y direction. Channel 10 is surrounded by a steam jacket 12 through which steam is circulated. A hollow rod 14 extends longitudinally down the center of the channel. A plurality of paddles 16 are mounted on the rod 14 down its longitudinal length. The rod 14 is rotated and the paddles are angled such that as the rod rotates the paddles, mix the tempered product and push the product down channel 10. The paddles have openings 18 which extend through the paddles to the hollow center of rod 14. These openings are to transmit steam going through the rod and paddles so that the steam may be injected into the particulate food product being transmitted down channel 10. As the rod rotates the paddles push product down the conduit to exit aperture 20 through which the cooked germ flows. The openings in the paddles may be opened or closed to control steam injection into the product being transmitted down the channel. The amount of steam injected is effective for heating and cooking the product such that a product with an enhanced masa flavor is obtained. Additional indirect heating of the tempered product and the cooking channel is done by using indirect heat from the jacket of the device. Enough steam is injected to cook the tempered product to provide the cooked product with a temperature of at least about 150° F. A device which can be used to cook the tempered product as described herein is available as a Solidaire Model SJCS 8-4 from the Hosokawa Bepex Corporation, 333 N.E. Taft Street, Minneapolis, Minn. 55413.

EXAMPLES

Example I

Making the Flavored Germ Powder

Corn germ is separated from corn with a degerminator and the germ is flattened on a roll mill. The germ is collected using an aspirator and a sifter. To the germ is added 10% lime and 30% water and the materials are blended for 5 minutes. Steam is injected to the blend to bring the temperature to 198° F. for 3 minutes. The cooked germ is then dried in a rotary dryer with steamed heat exchange tubes and forced air to a moisture content of 10%. The dried germ is then hammer milled and sifted to a granulation with 100% through 16 W mesh (1.18 mm opening).

Example II

Enhanced Flavor in Masa Flour

Flavored germ powder made as described above is blended (4%) with Snack 1Y, a fine yellow masa flour made by Illinois Cereal Mills. The resultant mixture has stronger masa aroma than a sample of regular Snack 1Y. 100 mL of boiling water is added to 10 grams of the resultant mixture and hot flavor is assessed by smelling the mixture while stirring with a plastic spoon. Compared with regular Snack 1Y, the sample with flavored term has significantly stronger masa aroma.

Example III

Tortilla Chips with Enhanced Flavor

Flavored germ powder made as described above is blended (1.5%) to Chip 21W, a medium granulation white masa flour made by Illinois Cereal Mills. Tests are done to compare this enhanced flour to the regular Chip 21W. A dough is made by adding 42 lbs. of 90° F. water to 50 lbs. of masa flour and mixing for 5 minutes. The dough is then sheeted and cut into pieces in triangular shape, and then baked in a 3-pass gas oven to a moisture content of 34%. The baked pieces are fried in vegetable oil at 350° for about 45 seconds to a moisture content of about 1.8%. Tortilla chips made from Chip 21W with flavored germ have stronger masa flavor than those from regular Chip 21W.

Similarly, 3% flavored germ powder is added to Chip 21Y, a medium granulation yellow masa flour made by Illinois Cereal Mills. This flour enhanced with flavored germ is compared with regular Chip 21Y in the same way as described for Chip 21W. Tortilla chips made from Chip 21Y with flavored germ have stronger masa flavor than those made from regular Chip 21Y.

Example IV

Tortilla with Enhanced Flavor

Flavored germ powder made as described above is blended (7%) into premium Ultra White, a tortilla masa flour made by Illinois Cereal Mills. A dough is made by adding 50 lbs. of 90° F. water to 50 lbs. of the dried flour and mixing for 5 minutes. The dough is then sheeted and cut into pieces in round shape, and then baked in a 3-pass gas over to a moisture content of 48%. Tortilla made from this masa flour made with flavored germ has stronger masa flavor than those from a regular tortilla flour.

Example V

Wheat Flour Tortilla with Masa Flavor

To make a dough, 100% wheat flour, 52% water, 11% shortening, 5% masa flavor powder from Example 1, 1.5% salt, and 1.5% baking powder are mixed in a Kitchen Aid® mixer for 5 minutes. The dough is divided into 50 g pieces. After resting for 20 minutes, the dough is pressed using a hot press and then baked in a three-pass gas oven.

Example VI

Wheat Flour Bread with Masa Flavor

To make a dough, 100% wheat flour, 65% water, 8% masa flavor powder from Example 1, 6% nonfat dry milk, 6% shortening, 5% sugar, 2% salt, and 3% compressed yeast are mixed in a Kitchen Aid® mixer for 5 minutes. After resting for 10 minutes, the dough is divided into 500 g pieces and placed in baking pans. The pans are kept in a fermentation cabinet at 80% F. with 75% relative humidity for 2.5 hours. The dough is then punched and proofed at 95° F. with 85% relative humidity for 45 minutes. The dough is baked at 425° F. for 25 minutes. The bread is cooled and sliced.

Example VII

Soft Pretzels with Masa Flavor

To make a dough, 54% wheat flour, 32% water, 8% masa flavor powder from Example 1, 2% yeast, 1.5% sugar, 1.5% salt and 1% shortening are mixed in a Kitchen Aid® mixer for 5 minutes. After resting for 18 hours, the dough is rolled into cylindrical shape, divided into portions and twisted into desired forms. The raw pretzel is then dipped in 1.2% NaOH solution at 190° F. for about 10 seconds. Salt is sprinkled on the pretzel surface before baking at 450° F. for 15 minutes.

What is claimed is:

1. A food additive having a masa flavor, the additive comprising:
    alkaline cooked cereal germ, wherein the cereal germ comprises at least 50 weight percent germ and not more than 40 weight percent endosperm.

2. The food additive as recited in claim 1 wherein
the cereal germ, water and alkaline agent are mixed to provide an alkaline germ blend; and
cooking the alkaline germ blend for a time and temperature which is effective for providing an alkaline cooked cereal germ with a masa flavor.

3. The food additive as recited in claim 2 wherein the alkaline agent to cook the germ is selected from the group consisting of CaO, Ca(OH)$_2$, CaCO$_3$ and mixtures thereof.

4. The food additive as recited in claim 3, wherein the alkaline germ blend is cooked with steam.

5. The food additive as recited in claim 4, wherein the food additive is dried to a moisture content of not more than about 14 weight percent to provide a dried cooked additive.

6. The food additive as recited in claims 1 or 5, wherein the alkaline cooked cereal germ is milled so that it will pass through a screen with a mesh size of less than about 1.18 square mm mesh screen size.

7. The food additive as recited in claim 1, wherein the cereal germ comprises at least about 90% corn germ.

8. A process for making an alkaline cooked cereal germ with a masa flavor, the process comprising:
 (a) mixing a cereal germ, water and an alkaline agent to provide an aqueous alkaline germ blend, the cereal germ comprising at least about 50 weight germ and not more than 40 weight percent endosperm; and
 (b) cooking the aqueous alkaline germ blend for a time and temperature effective to provide an alkaline cooked cereal germ which has a masa flavor.

9. The process as recited in claim 8, wherein the alkaline agent is selected from the group consisting of CaO, Ca(OH)$_2$, CaCO$_3$ and mixtures thereof.

10. The process as recited in claim 9, wherein the cereal germ comprises at least about 90% corn germ.

11. The process as recited in process as recited in claims 8, 9 or 10, wherein the alkaline cooked cereal germ is milled so that it will pass through a screen with a mesh of less than about 0.1 square mm mesh screen size.

12. The process as recited in claims 8 or 9 wherein the aqueous alkaline germ blend is cooked with steam.

13. The process as recited in claims 8 or 9, wherein the alkaline cooked cereal germ is dried to a moisture content of not more than about 14 weight percent to provide a dried alkaline cooked cereal germ.

14. The process as recited in claim 13, wherein the alkaline cooked cereal germ is milled so that it will pass through a screen with a mesh size of at least about 0.1 square mm mesh screen size.

15. A process for making alkaline cooked corn germ with a masa flavor, the process comprising:
 (a) mixing corn germ comprising at least about 50 weight percent corn germ and not more than 40 weight percent endosperm, water, and an alkaline agent selected from the group consisting of CaO, Ca(OH)$_2$, CaCO$_3$ and mixtures thereof to provide an aqueous alkaline corn germ blend; and
 (b) cooking the aqueous alkaline corn germ blend with steam for a time and temperature effective to provide an alkaline cooked cereal germ which has a masa flavor.

16. The process as recited in claim 15, wherein the corn germ comprises at least about 90 weight percent corn germ.

17. The process as recited in claim 15, wherein the alkaline cooked corn germ is dried to a moisture content of not more than about 14 weight percent to provide a dried alkaline cooked corn germ.

18. The process as recited in claim 17 wherein the drying comprises heating the alkaline cooked corn germ in a rotary dryer comprising heat exchange tubes onto which the alkaline cooked corn germ contacts during said drying.

19. The process as recited in claim 15, wherein the alkaline cooked corn germ is milled so that it will pass through a screen with a mesh size of less than about 0.1 square mm mesh screen size.

20. A process for making an alkaline cooked cereal germ with a masa flavor, the process comprising:
 (a) flattening cereal germ comprising at least about 50 weight germ and not more than 40 weight percent endosperm to provide a flattened cereal germ;
 (b) mixing the flattened cereal germ, water, and an alkaline agent selected from the group consisting of CaO, Ca(OH)$_2$, CaCO$_3$ and mixtures thereof to provide an aqueous alkaline cereal germ blend comprising from about 0.5 to about 50 weight percent alkaline agent and at least about 25 weight percent water;
 (c) tempering aqueous alkaline cereal germ blend to increase moisture content thereof to provide a tempered aqueous alkaline cereal germ blend; and
 (d) cooking the tempered aqueous alkaline cereal germ blend with steam to bring the temperature of the tempered aqueous alkaline cereal germ blend to 150° F. to about 300° F. for about 15 seconds to about 20 minutes to provide an alkaline cooked cereal germ.

21. The process as recited in claim 20 wherein the process further comprises drying the alkaline cooked cereal germ.

22. The process as recited in claims 20 or 21 wherein the cereal germ is corn germ.

23. The process as recited in claim 22 wherein the drying comprises heating the alkaline cooked cereal germ in a rotary dryer comprising heat exchange tubes onto which the alkaline cooked cereal germ contacts during said drying.

24. A food additive having a masa flavor, the additive made by a process comprising:
 flattening cereal germ comprising at least about 50 weight germ and not more than 40 weight percent endosperm to provide a flattened cereal germ;
 mixing the flattened cereal germ, water, and an alkaline agent selected from the group consisting of CaO, Ca(OH)$_2$, CaCO$_3$ and mixtures thereof to provide an aqueous alkaline cereal germ blend comprising from about 0.1 to about 50 weight percent alkaline agent and at least about 25 weight percent water;
 tempering aqueous alkaline cereal germ blend to increase moisture content thereof to provide a tempered aqueous alkaline cereal germ blend; and
 cooking the tempered aqueous alkaline cereal germ blend with steam to bring the temperature of the tempered aqueous alkaline cereal germ blend to 150° F. to about 300° F. for about 15 seconds to about 20 minutes to provide a alkaline cooked cereal germ.

25. The food additive as recited in claim 24 wherein the cereal germ is corn germ.

26. A cereal grain flour which may be mixed with water to form a dough from which a cooked food product may be prepared, comprising:
 (a) a cereal grain flour comprising masa flour; and
 (b) the additive of claim 1.

27. A cereal grain flour as recited in claim 26 the additive is mixed with the flour at a level of from about 0.5 to about 20.0 weight percent of the combined weight.

28. A food additive having a masa flavor, the additive comprising alkaline cooked cereal germ, wherein the alkaline cooked cereal germ is milled so that it will pass through a screen with a mesh size of less than 1.18 square mm mesh screen size.

29. The food additive as recited in claim 28 wherein the cereal germ, water and alkaline agent are mixed to provide an alkaline germ blend; and cooking the alkaline germ blend for a time and temperature which is effective for providing an alkaline cooked cereal germ with a masa flavor.

30. The food additive as recited in claim 29, wherein the cereal germ comprises at least 90% corn germ.

31. The food additive as recited in claim 29 wherein the cereal germ comprises at least 50 weight percent germ and the alkaline agent is selected from the group consisting of CaO, Ca(OH)$_2$, CaCO$_3$ and mixtures thereof.

32. The food additive as recited in claim 31, wherein the alkaline germ blend is cooked with steam.

33. The food additive as recited in claim 32, wherein the cereal germ comprises not more than 40 weight percent endosperm.

34. The food additive as recited in claim 32, wherein the food additive is dried to a moisture content of not more than 14 weight percent to provide a dried cooked additive.

35. The food additive as recited in claim 31, wherein the cereal germ comprises not more than 40 weight percent endosperm.

36. A process for making an alkaline cooked cereal germ with a masa flavor, the process comprising:

(a) mixing a cereal germ, water and an alkaline agent to provide an aqueous alkaline germ blend; and (b) cooking the aqueous alkaline germ blend for a time and temperature effective to provide an alkaline cooked cereal germ which has a masa flavor, wherein the alkaline cooked cereal germ is milled so that it will pass through a screen with a mesh of less than 0.1 square mm mesh screen size.

37. The process as recited in claim 36, wherein the cereal germ comprises at least about 50 weight percent germ and the alkaline agent is selected from the group consisting of CaO, Ca(OH)$_2$, CaCO$_3$ and mixtures thereof.

38. The process as recited in claim 37, wherein the cereal germ comprises not more than 40 weight percent endosperm.

39. The process as recited in claim 37, wherein the cereal germ comprises at least 90% corn germ.

40. The process as recited in claim 36, wherein the cereal germ comprises not more than 40 weight percent endosperm.

41. The process as recited in claims 36, 37, or 39 wherein the aqueous alkaline germ blend is cooked with steam.

42. The process as recited in claims 36 or 37, wherein the alkaline cooked cereal germ is dried to a moisture content of not more than 14 weight percent to provide a dried alkaline cooked cereal germ.

43. A process for making alkaline cooked corn germ with a masa flavor, the process comprising:

(a) mixing corn germ comprising at least 50 weight percent corn germ, water, and an alkaline agent selected from the group consisting of CaO, Ca(OH)$_2$, CaCO$_3$ and mixtures thereof to provide an aqueous alkaline corn germ blend; and (b) cooking the aqueous alkaline corn germ blend with steam for a time and temperature effective to provide an alkaline cooked cereal germ which has a masa flavor, wherein the alkaline cooked corn germ is milled so that it will pass through a screen with a mesh size of less than 0.1 square mm mesh screen size.

44. The process as recited in claim 43, wherein the corn germ comprises at least 90 weight percent corn germ.

45. The process as recited in claim 44, wherein the cereal germ comprises not more than 40 weight percent endosperm.

46. The process as recited in claim 43, wherein the alkaline cooked corn germ is dried to a moisture content of not more than 14 weight percent to provide a dried alkaline cooked corn germ.

47. The process as recited in claim 46 wherein the drying comprises heating the alkaline cooked corn germ in a rotary dryer comprising heat exchange tubes onto which the alkaline cooked corn germ contacts during said drying.

* * * * *

UNITED STATES PATENT AND TRADEMARK OFFICE
CERTIFICATE OF CORRECTION

PATENT NO. : 6,638,558 B2  Page 1 of 1
DATED : October 28, 2003
INVENTOR(S) : Brubacher et al.

It is certified that error appears in the above-identified patent and that said Letters Patent is hereby corrected as shown below:

Column 9,
Line 35, delete the second occurrence, "process as recited in".

Column 10,
Line 52, change "a alkaline" to -- an alkaline --.
Line 60, after "26" insert -- wherein --.

Signed and Sealed this

Eleventh Day of May, 2004

JON W. DUDAS
*Acting Director of the United States Patent and Trademark Office*